UNITED STATES PATENT OFFICE.

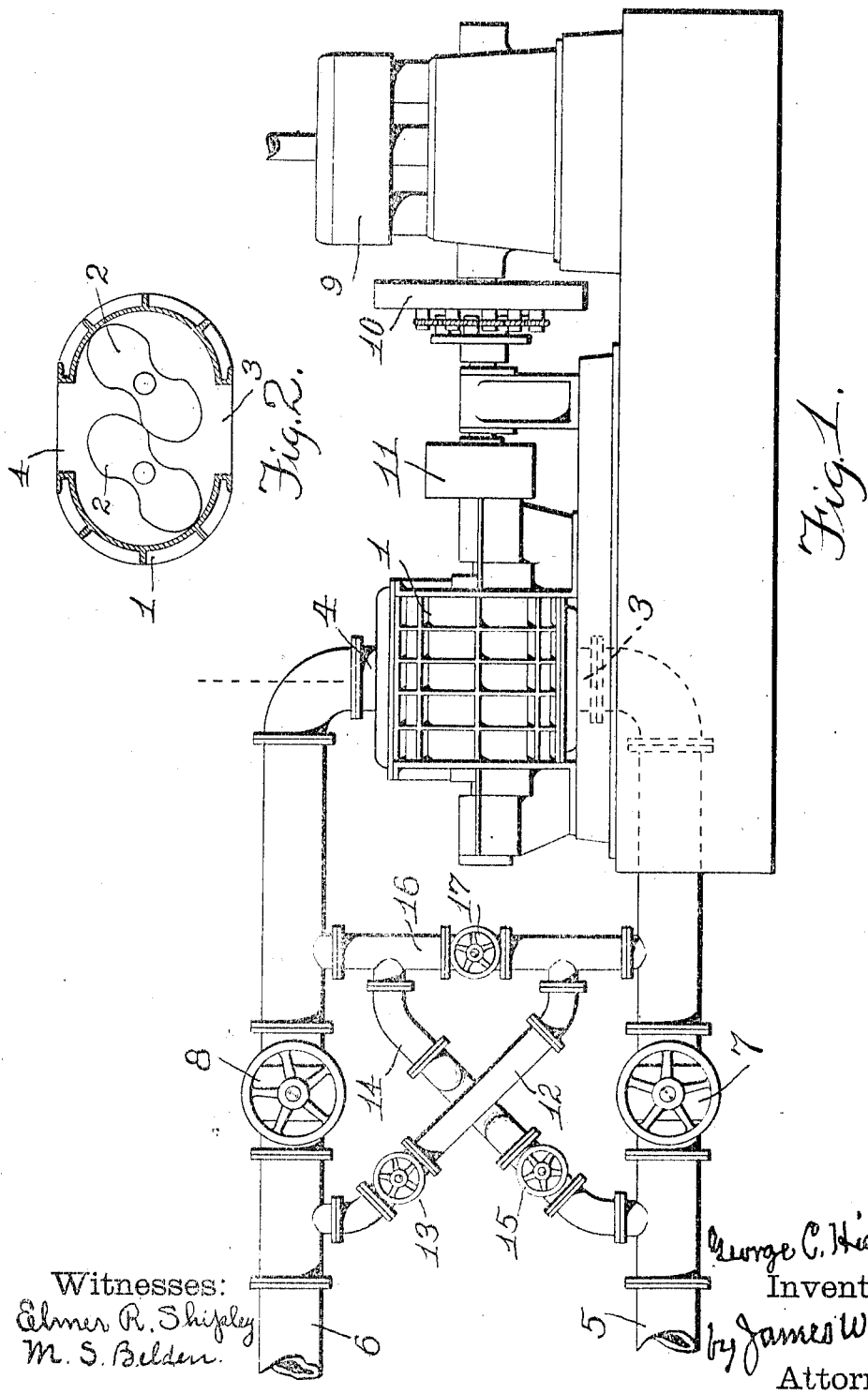

GEORGE C. HICKS, JR., OF CONNERSVILLE, INDIANA, ASSIGNOR TO THE P. H. & F. M. ROOTS COMPANY, OF CONNERSVILLE, INDIANA.

GAS-ENGINE STARTER.

956,852.   Specification of Letters Patent.   Patented May 3, 1910.

Application filed January 12, 1910. Serial No. 537,587.

*To all whom it may concern:*

Be it known that I, GEORGE C. HICKS, Jr., a citizen of the United States, residing at Connersville, Fayette county, Indiana, have invented certain new and useful Improvements in Gas-Engine Starters, of which the following is a specification.

This invention relates to a device for use in starting gas engines employed in pumping, as, for instance, a gas engine employed in operating an exhauster or blower, and the invention will be readily understood from the following description taken in connection with the accompanying drawing in which:—

Figure 1 is a side elevation of apparatus embodying an exemplification of my invention: and Fig. 2 a vertical transverse section of the exemplifying rotary system.

In the drawing:—1, indicates a rotary exhauster or blower of the well known Roots type: 2, its impellers: 3, its suction inlet: 4, its discharge outlet: 5, the suction-pipe: 6, the discharge pipe: 7, a valve in the suction pipe: 8, a valve in the discharge pipe: 9, a gas engine, of any ordinary compression type: 10, the coupling connecting the gas engine with one of the impeller shafts of the exhauster, as usual: 11, the casing of the usual gearing connecting the two impeller shafts of the exhauster: 12, a pipe connected at one end with the suction-pipe 5 at a point between valve 7 and the exhauster, and connected at its other end with discharge pipe 6 at a point outwardly beyond valve 8: 13, a valve in pipe 12: 14, a pipe connected at one end with discharge pipe 6 at a point between valve 8 and the exhauster, and connected at its other end with suction-pipe 5 at a point outwardly beyond valve 7: 15, a valve in pipe 14: 16, a by-pass pipe connecting suction-pipe 5, and discharge-pipe 6 at points between the exhauster and their respective valves 7 and 8: and 17, a valve in pipe 16.

Looking at Fig. 2 it will be readily understood that if the impellers be turned by power in the proper direction gas, assuming gas to be dealt with, will be sucked in at suction inlet 3 and compressed and discharged at discharge outlet 4. It is the duty of the gas engine, as usual, to produce this active rotation of the impellers in the ordinary operation of the machine. When the machine is thus in normal operation valves 7 and 8 are to be open while valves 13, 15 and 17 are to be closed, under which conditions the machine will work as though pipes 12, 14 and 16 were not present, and discharge pipe 6 will be delivering gas under pressure.

Looking at Fig. 2 it becomes obvious, not only that the forceful turning of the impellers in the proper direction, by extraneous power, will suck in gas at inlet 3 and force it out under pressure at outlet 4, but also that if, instead of turning the impellers by extraneous power, gas under pressure were admitted at inlet 3 it would result in the forceful turning of the impellers, the gas exhausting through outlet 4. In other words, the exhauster and blower is not only a pump, when driven by extraneous power, but it may also be a motor and drive extraneous mechanism when its inlet is subjected to a higher pressure than the outlet.

In the present system the pump, to so call the exhauster or blower, is to be passively driven by the gas engine in the ordinary operation of the system, and, when the gas engine is to be started then the pump is to become an active agent in moving the gas engine to produce its necessary starting compression.

Assume the machine to have been in normal operation, as hereinbefore described, and assume it has been brought to rest and requires re-starting. In such case valves 7 and 8 are to be closed and valves 13 and 15 opened, valve 17 remaining closed. Pressure from discharge pipe 6 now passes through pipe 12 to the inlet 3 of the pump and brings about the forceful turning of the impellers, the pressure exhausting through outlet 4 and pipe 14 to suction pipe 5. This forceful turning of the impellers causes the pump to act as a motor and drive the gas engine in normal direction to bring about within it the initial compression necessary for starting it. The gas in the gas engine is then to be ignited, as usual, whereupon the gas engine proceeds to drive the pump. At this time, valves 13 and 15 are to be closed and valve 17 opened whereupon the medium being dealt with circulates through the pump and through pipe 16 until the gas engine is up to normal speed. When this point is reached then valve 17 is to be gradually closed and valves 7 and 8 opened, whereupon the machine proceeds to operate under normal conditions.

Attention may be called to the fact that in the particular type of pump chosen for illustration, the inlet and outlet are interchangeable. For instance, in Fig. 2 connection 3 has been referred to as the suction inlet and connection 4 has been referred to as the discharge outlet, but it is manifest that the functions of these connections may be reversed. In other words, taking the entire system illustrated, it is quite immaterial which direction the pump turns in, understanding, of course, that a reversal of direction of motion of the pump brings about a corresponding transposition of the functions of pipes 5 and 6. Whichever direction the pump is to turn in, it is the duty of the gas engine to turn it in that direction, and when the pump is to serve temporarily as a motor, then it is the duty of the pump to turn in normal direction and turn the gas engine in normal direction.

It is to be understood that the particular construction illustrated is merely an exemplifying one and subject to many modifications likely to suggest themselves to the skilled constructor.

I have explained the principle of my invention and have described the best form in which I at present contemplate embodying that principle.

I claim:—

1. Gas engine starting mechanism comprising, a gas engine, a pump connected therewith and adapted to be driven thereby, a suction-pipe connected with the inlet of the pump, a discharge pipe connected with the outlet of the pump, a valve in the suction-pipe, a valve in the discharge pipe, a first conduit placing a point in the suction-pipe between the pump and the valve in the suction-pipe in communication with the discharge-pipe at a point outwardly beyond the valve in the discharge-pipe, a second conduit placing a point in the discharge-pipe between the pump and the valve in the discharge-pipe in communication with a point in the suction-pipe outwardly beyond the valve in the suction-pipe, and a valve in each of said conduits, combined substantially as set forth, whereby pressure from the discharge-pipe may go to the inlet of the pump and cause the pump to act as a motor to temporarily drive the gas engine in normal direction.

2. Gas engine starting mechanism comprising, a gas engine, a pump connected therewith and adapted to be driven thereby, a suction-pipe connected with the inlet of the pump, a discharge-pipe connected with the outlet of the pump, a valve in the suction-pipe, a valve in the discharge-pipe, a first conduit placing a point in the suction-pipe between the pump and the valve in the suction-pipe in communication with the discharge-pipe at a point outwardly beyond the valve in the discharge-pipe, a second conduit placing a point in the discharge-pipe between the pump and the valve in the discharge-pipe in communication with the point in the suction-pipe outwardly beyond the valve in the suction-pipe, and a valve in each of said conduits, a by-pass conduit placing the suction-pipe and discharge-pipe in communication at points between their valves and the pump, and a valve in said by-pass conduit, combined substantially as set forth.

GEORGE C. HICKS, Jr.

Witnesses:
E. D. JOHNSTON,
J. F. SCHWEIKLE.